United States Patent
Brosnan et al.

(10) Patent No.: US 7,119,323 B1
(45) Date of Patent: Oct. 10, 2006

(54) ERROR CORRECTED OPTICAL NAVIGATION SYSTEM

(75) Inventors: Michael J. Brosnan, Fremont, CA (US); Tong Xie, San Jose, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 61 days.

(21) Appl. No.: 11/083,796

(22) Filed: Mar. 18, 2005

(51) Int. Cl.
G06M 7/00 (2006.01)
H01J 40/14 (2006.01)

(52) U.S. Cl. ............... 250/221; 250/208.1; 345/163; 345/165

(58) Field of Classification Search ............ 250/208.1, 250/208.2, 221, 559.29, 559.44; 345/157–169
See application file for complete search history.

(56) References Cited

U.S. PATENT DOCUMENTS 6,433,780 B1 * 8/2002 Gordon et al. ............ 345/166
6,525,306 B1 * 2/2003 Bohn .................... 250/221

* cited by examiner

Primary Examiner—Stephone B. Allen
Assistant Examiner—Patrick J. Lee

(57) ABSTRACT

An optical navigation system. The optical navigation system includes an image sensor capable of optical coupling to a surface of an object, a data storage device, and a navigation circuit. The data storage device is capable of storing successive images captured by the image sensor. The navigation circuit includes a first digital circuit capable of determining an optical displacement estimate for a relative displacement between the image sensor and the object obtained by comparing the images, a second digital circuit capable of determining a mechanical displacement estimate for the relative displacement obtained from consideration of a mechanical characteristic associated with the optical navigation system, and a third digital circuit capable of determining an adjusted displacement estimate obtained from the optical displacement estimate and the mechanical displacement estimate.

20 Claims, 11 Drawing Sheets

ERROR CORRECTED OPTICAL NAVIGATION SYSTEM

REFERENCE TO RELATED APPLICATIONS

The subject matter of the instant Application is related to that of U.S. Pat. No. 6,433,780 by Gordon et al., entitled "Seeing Eye Mouse for a Computer System" issued 13 Aug. 2002 and assigned to Agilent Technologies, Inc. This Patent describes a basic technique for reducing the amount of computation needed for cross-correlation, which techniques include components of the representative embodiments described below. Accordingly, U.S. Pat. No. 6,433,780 is hereby incorporated herein by reference.

BACKGROUND

One of the most common and, at the same time, useful input devices for user control of modern computer systems is the mouse. The main goal of a mouse as an input device is to translate the motion of an operator's hand into signals that the computer can use. This goal is accomplished by displaying on the screen of the computer's monitor a cursor which moves in response to the user's hand movement. Commands which can be selected by the user are typically keyed to the position of the cursor. The desired command can be selected by first placing the cursor, via movement of the mouse, at the appropriate location on the screen and then activating a button or switch on the mouse.

Positional control of cursor placement on the monitor screen was initially obtained by mechanically detecting the relative movement of the mouse with respect to a fixed frame of reference, i.e., the top surface of a desk or a mouse pad. A common technique is to use a ball inside the mouse which in operation touches the desktop and rolls when the mouse moves. Inside the mouse there are two rollers which touch the ball and roll as the ball rolls. One of the rollers is oriented so that it detects motion in a nominal X direction, and the other is oriented 90 degrees to the first roller so it detects motion in the associated Y direction. The rollers are connected to separate shafts, and each shaft is connected to a separate optical encoder which outputs an electrical signal corresponding to movement of its associated roller. This signal is appropriately encoded and sent typically as binary data to the computer which in turn decodes the signal it received and moves the cursor on the computer screen by an amount corresponding to the physical movement of the mouse.

More recently, optical navigation techniques have been used to produce the motion signals that are indicative of relative movement along the directions of coordinate axes. These techniques have been used, for instance, in optical computer mice and fingertip tracking devices to replace conventional mice and trackballs, again for the position control of screen pointers in windowed user interfaces for computer systems. Such techniques have several advantages, among which are the lack of moving parts that accumulate dirt and that suffer from mechanical wear when used.

Distance measurement of movement of paper within a printer can be performed in different ways, depending on the situation. For printer applications, we can measure the distance moved by counting the number of steps taken by a stepper motor, because each step of the motor will move a certain known distance. Another alternative is to use an encoding wheel designed to measure relative motion of the surface whose motion causes the wheel to rotate. It is also possible to place marks on the paper that can be detected by sensors.

Motion in a system using optical navigation techniques is measured by tracking the relative displacement of a series of images. First, a two dimensional view of an area of the reference surface is focused upon an array of photo detectors, whose outputs are digitized and stored as a reference image in a corresponding array of memory. A brief time later a second image is digitized. If there has been no motion, then the image obtained subsequent to the reference image and the reference image are essentially identical. If, on the other hand, there has been some motion, then the subsequent image will have been shifted along the axis of motion with the magnitude of the image shift corresponding to the magnitude of physical movement of the array of photosensors. The so called optical mouse used in place of the mechanical mouse for positional control in computer systems employ this technique.

In practice, the direction and magnitude of movement of the optical mouse can be measured by comparing the reference image to a series of shifted versions of the second image. The shifted image corresponding best to the actual motion of the optical mouse is determined by performing a cross-correlation between the reference image and each of the shifted second images with the correct shift providing the largest correlation value. Subsequent images can be used to indicate subsequent movement of the optical mouse using the method just described.

At some point in the movement of the optical mouse, however, the image obtained which is to be compared with the reference image may no longer overlap the reference image to a degree sufficient to be able to accurately identify the motion that the mouse incurred. Before this situation can occur it is necessary for one of the subsequent images to be defined as a new reference image. This redefinition of the reference image is referred to as re-referencing.

Measurement inaccuracy in optical navigation systems is a result of the manner in which such systems obtain their movement information. Optical navigation sensors operate by obtaining a series of images of an underlying surface. This surface has a micro texture. When this micro texture is illuminated (typically at an angle) by a light, the micro texture of the surface results in a pattern of shadows that is detected by the photosensor array. A sequence of images of these shadow patterns are obtained, and the optical navigation sensor attempts to calculate the relative motion of the surface that would account for changes in the image. Thus, if an image obtained at time t(n+1) is shifted left by one pixel relative to the image obtained at time t(n), then the optical navigation sensor most likely has been moved right by one pixel relative to the observed surface.

As long as the reference frame and current frame overlap by a sufficient amount, movement can be calculated with sub-pixel accuracy. However, a problem occurs when an insufficient overlap occurs between the reference frame and the current frame, as movement cannot be determined accurately in this case. To prevent this problem, a new reference frame is selected whenever overlap between the reference frame and the current frame is less than some threshold. However, because of noise in the optical sensor array, the sensor will have some amount of error introduced into the measurement of the amount of movement each time the reference frame is changed. Thus, as the size of the measured movement increases, the amount of error will increase as more and more new reference frames are selected.

Due to the lack of absolute positional reference, at each re-referencing, any positional errors from the previous re-referencing procedure are accumulated. When the optical mouse sensor travels over a long distance, the total cumulative position error built up can be significant. If the photosensor array is 30×30, re-referencing may need occur each time the mouse moves 15 pixels or so (15 pixels at 60 microns per pixel=one reference frame update every 0.9 mm). The amount of measurement error over a given distance is proportional to $E*(N)^{1/2}$, where E is the error per reference frame change, and N is the number of reference frame updates.

SUMMARY

An optical navigation system. The optical navigation system comprises an image sensor capable of optical coupling to a surface of an object, a data storage device, and a navigation circuit. The data storage device is capable of storing successive images captured by the image sensor. The navigation circuit comprises a first digital circuit capable of determining an optical displacement estimate for a relative displacement between the image sensor and the object obtained by comparing the images, a second digital circuit capable of determining a mechanical displacement estimate for the relative displacement obtained from consideration of the mechanical characteristics of the optical navigation system, and a third digital circuit capable of determining an adjusted displacement estimate obtained from the optical displacement estimate and the mechanical displacement estimate.

In another representative embodiment, a method for error correcting an optical navigation system is disclosed. The method steps comprise optically coupling an image sensor to a surface of an object, capturing successive images with the image sensor of areas of the surface, storing the successive images, determining an optical displacement estimate for a relative displacement between the image sensor and the object by a comparison of the images, determining a mechanical displacement estimate for the relative displacement by consideration of a mechanical characteristic associated with the optical navigation system, and determining an adjusted displacement estimate from the optical displacement estimate and the mechanical displacement estimate.

Other aspects and advantages of the representative embodiments presented herein will become apparent from the following detailed description, taken in conjunction with the accompanying drawings.

BRIEF DESCRIPTION OF THE DRAWINGS

The accompanying drawings provide visual representations which will be used to more fully describe various representative embodiments and can be used by those skilled in the art to better understand them and their inherent advantages. In these drawings, like reference numerals identify corresponding elements.

DETAILED DESCRIPTION

Figure 1:
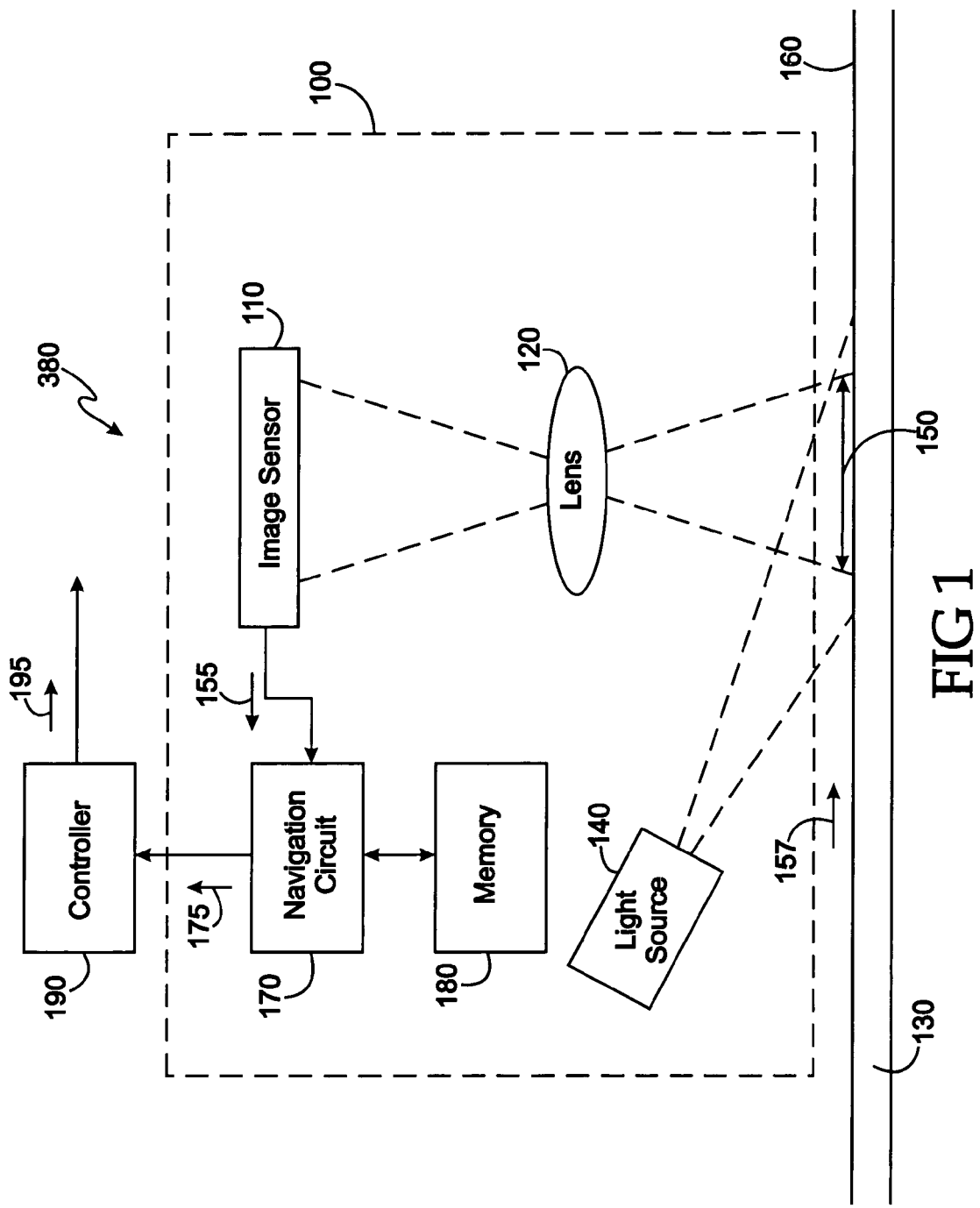
FIG. 1 is a drawing of a block diagram of an optical navigation system as described in various representative embodiments.

As shown in the drawings for purposes of illustration, the present patent document discloses a novel optical navigation system. Previous systems capable of optical navigation have had limited accuracy in measuring distance. In representative embodiments, optical navigation systems are disclosed which provide for increased accuracy in the reported position of the optical navigation system.

In the following detailed description and in the several figures of the drawings, like elements are identified with like reference numerals.

As previously indicated, optical navigation sensors are used to detect the relative motion of an illuminated surface. In particular, an optical mouse detects the relative motion of a surface beneath the mouse and passes movement information to an associated computer. The movement information contains the direction and amount of movement. While the measurement of the amount of movement has been considered generally sufficient for purposes of moving a cursor, it may not be accurate enough for other applications, such as measurement of the movement of paper within a printer.

Due to the lack of absolute positional reference, at each re-referencing, any positional errors from the previous re-referencing procedure are permanently built into the system. As the mouse sensor travels over a long distance, the total cumulative position error built up can be significant, especially in printer and other applications.

In representative embodiments disclosed herein, information from an optical navigation system and information regarding the mechanical acceleration/velocity profile of the system are combined to provide a more accurate estimate of the true position of the optical navigation system. The optical navigation system can comprise an optical sensor such as an image sensor to track, for example, paper movement in a printer. Information regarding the mechanical profile of the motors driving the paper feed and/or print head mechanism, as well as any attached components, are combined with the optically derived positional information to obtain increased positional accuracy of the optical sensor system. Advantage is taken of the fact that motion typically occurs in only one axis at a time in a printer. Since the paper advance mechanism has a certain mass and experiences a certain force (or rotational inertia and torque) during movement, the acceleration of the paper with respect to the navigation sensor is limited. The navigation sensor adds some random error to the basic motion profile. By taking the measurements of the navigation sensor from every image frame and fitting them to a motion profile formula or table consistent with the acceleration and velocity limits (or current known drive values), the true paper surface movement can be determined more accurately than with the optical navigation sensor alone.

High frequency random position errors can be smoothed out since they aren't physically plausible given the inertia of the system. However, absolute position accuracy over a longer time period can still be obtained from the navigation sensor. Positional jitter would be greatly reduced by this technique when the paper is not moving by essentially averaging out the random sensor errors.

In addition, it is possible to alter the re-referencing strategy based on which direction the paper is currently moving. When the paper is moving along the X-axis, new references could be acquired for image shifts of, for example, ½ array size in X and not consider Y-axis shifts in determining when to take new references. The fractional overlap threshold for re-referencing could also be changed differently for the X-axis and the Y-axis based on speed and accuracy expectations of the 2 axes.

It is also possible to determine the sensor position at times between images. For example, suppose images are taken 10,000 times per second and the paper is moving at about 1 meter per second. Images are then taken approximately every 100 microns of movement. If the print head needs firing pulses every 25 microns of movement, these times can be calculated by the best fit motion profile from the combined navigation sensor and motor drive information, even though no pictures are taken at that time.

The motors providing motion in a printer are typically stepper motors or servo motors. They generally move either the paper or the print head at one time, but not both directions at the same time. The nature of our navigation algorithms is such that better accuracy can be obtained if motion occurs only in one direction at any given time.

FIG. 1 is a drawing of a block diagram of an optical navigation system 100 as described in various representative embodiments. The optical navigation system 100 can be attached to or a part of another device, as for example a print head or other part of a printer 380, an optical mouse 380 or the like. In FIG. 1, the optical navigation system 100 includes an image sensor 110, also referred to herein as an image sensor array 110, an optical system 120, which could be a lens 120 or a lens system 120, for focusing light reflected from a work piece 130, also referred to herein as an object 130 which could be a print media 130 which could be a piece of paper 130 which is also referred to herein as a page 130, onto the image sensor array 110. Illumination of the print media 130 is provided by light source 140. Image sensor array 110 is preferably a complementary metal-oxide semiconductor (CMOS) image sensor. However, other imaging devices such as a charge coupled-device (CCD), photo diode array or photo transistor array may also be used. Light from light source 140 is reflected from print media 130 and onto image sensor array 110 via optical system 120. The light source 140 shown in FIG. 1 could be a light emitting diode (LED). However, other light sources 140 can also be used including, for example, a vertical-cavity surface-emitting laser (VCSEL) or other laser, an incandescent light source, a fluorescent light source, or the like. Additionally, it is possible for ambient light sources 140 external to the optical navigation system 100 to be used provided the resulting light level is sufficient to meet the sensitivity threshold requirements of the image sensor array 110.

In operation, relative movement occurs between the work piece 130 and the optical navigation system 100 with images 150 of the surface 160, also referred to herein as a navigation surface 160, of the work piece 130 being periodically taken as the relative movement occurs. By relative movement is meant that movement of the optical navigation system 100, in particular movement of the image sensor 110, to the right over a stationary navigation surface 160 will result in navigational information equivalent to that which would be obtained if the object 130 were moved to the left under a stationary image sensor 110. Movement direction 157, also referred to herein as a first direction 157, in FIG. 1 indicates the direction that the optical navigation system 100 moves with respect to the stationary work piece 130. The specific movement direction 157 shown in FIG. 1 is for illustrative purposes. Depending upon the application, the work piece 130 and/or the optical navigation system 100 may be capable of movement in multiple directions.

The image sensor array 110 captures images 150 of the work piece 130 at a rate determined by the application and which may vary from time to time. The captured images 150 are representative of that portion of a navigation surface 160, which could be a surface 160 of the piece of paper 130, that is currently being traversed by the optical navigation system 100. The captured image 150 is transferred to a navigation circuit 170 as image signal 155 and may be stored into a data storage device 180, which could be a memory 180.

The navigation circuit 170 converts information in the image signal 155 into positional information that is delivered to the controller 190, i.e., navigation circuit 170 generates positional signal 175 and outputs it to controller 190. Controller 190 subsequently generates an output signal 195 that can be used to position a print head in the case of a printer application or other device as needed over the navigation surface 160 of the work piece 130. The navigation circuit 170 and/or the memory 180 can be configured as an integral part of navigation circuit 170 or separate from it. Further, navigation circuit 170 can be implemented as, for example, but not limited to, a dedicated digital signal processor, an application specific integrated circuit, or a combination of logic gates.

The optical navigation sensor must re-reference when the shift between the reference image and the current navigation image is more than a certain number of pixels, which might typically be ⅓ up to perhaps as much as ⅔ the sensor width. Assuming a ⅛ pixel standard deviation of positional random error, the cumulative error built-up in the system over a given travel will have a standard deviation of $\frac{1}{3}*(N)^{1/2}$ where N is the number of re-references that occurred. In a typical optical mouse today, re-referencing occurs after a movement of ⅓ of the sensor width. Thus, for a typical image sensor array 110 having 20×20 pixels, a re-reference action is taken when a positional change of more than 6-pixels is detected. If we assume a 50 micron pixel size, the image sensor 110 will have to re-reference with every 300 micron travel. Based on the relation above, it is apparent that the cumulative error can be reduced by reducing the number of re-references.

Figure 2A:
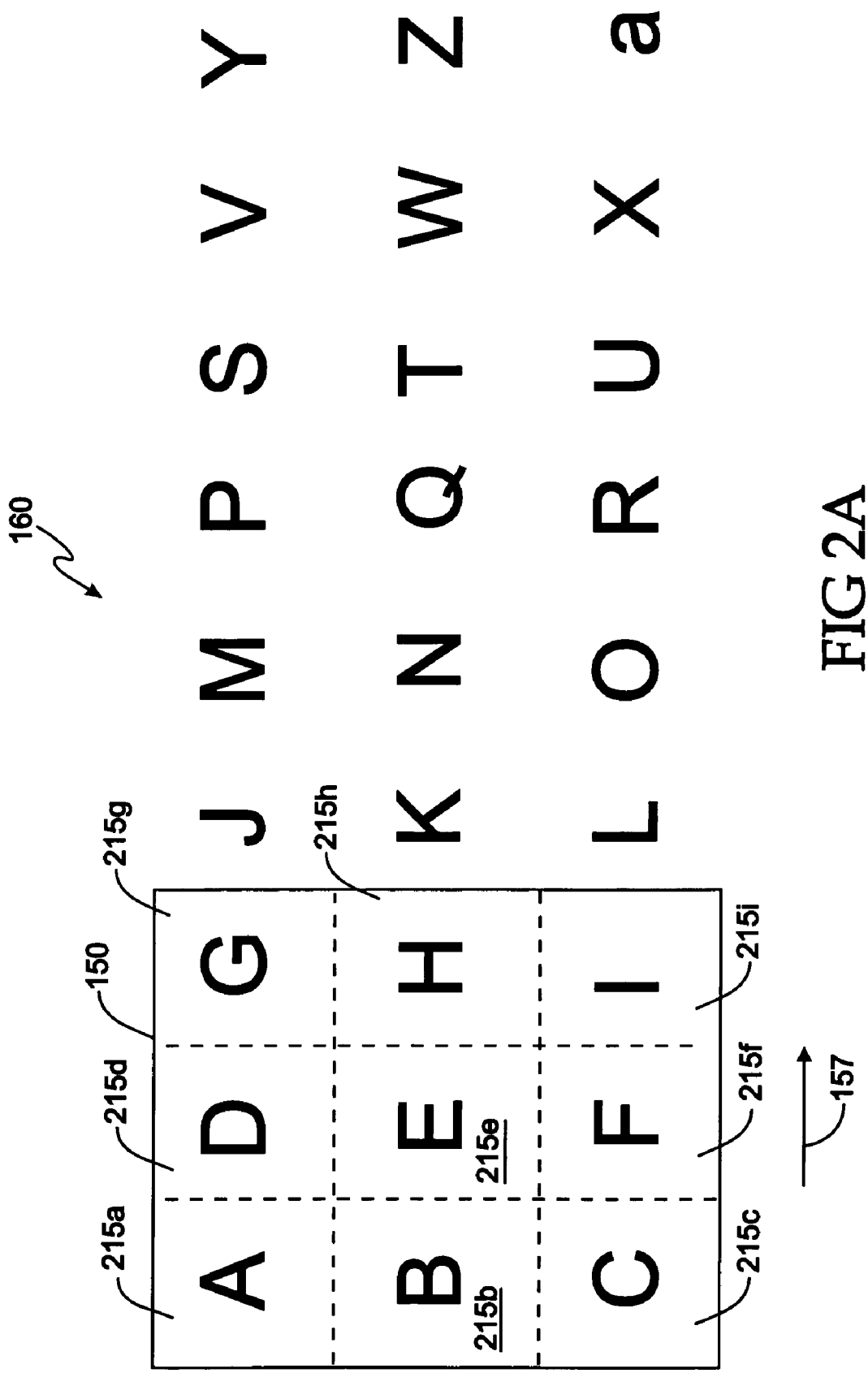
FIG. 2A is a drawing of a navigation surface as described in various representative embodiments.

FIG. 2A is a drawing of a navigation surface 160 as described in various representative embodiments. This figure also shows an outline of the image 150 obtainable by the image sensor 110 from an area of the navigation surface 160 as described in various representative embodiments. In FIG. 2A, the navigation surface 160 has a distinct surface characteristic or pattern. In this example, for purposes of illustration the surface pattern is represented by the alpha characters A . . . Z and a, also referred to herein as surface patterns A . . . Z and a. As just stated, overlaying the navigation surface 160 is the outline of the image 150 obtainable by overlaying the navigation surface 160 with the image sensor array 110 to the far left of FIG. 2A. As such, if the image sensor 110 were positioned as shown in FIG. 2A over the navigation surface 160, the image sensor 110 would be capable of capturing that area of the surface pattern of the navigation surface 160 represented by surface pattern A . . . I. For the representative embodiment of FIG. 2A, the image sensor 110 has nine pixels 215, also referred to herein as photosensitive elements 215, whose capture areas are indicated as separated by the dashed vertical and horizontal lines and separately as first pixel 215a overlaying navigation surface pattern A, second pixel 215b overlaying navigation surface pattern B, third pixel 215c overlaying navigation surface pattern C, fourth pixel 215d overlaying navigation surface pattern D, fifth pixel 215e overlaying navigation surface pattern E, sixth pixel 215f overlaying navigation surface pattern F, seventh pixel 215g overlaying navigation surface pattern G, eighth pixel 215h overlaying navigation surface pattern H, and ninth pixel 215i overlaying navigation surface pattern I. For navigational purposes, the captured image 150 represented by alpha characters A . . . I is the reference image 150 which is used to obtain navigational information resulting from subsequent relative motion between the navigation surface 160 and the image sensor array 110. By relative motion is meant that subsequent movement of the image sensor 110 to the right (movement direction 157) over a stationary navigation surface 160 will result in navigational information equivalent to that which would be obtained if the navigation surface 160 moved to the right under a stationary image sensor 110.

Figure 2B:
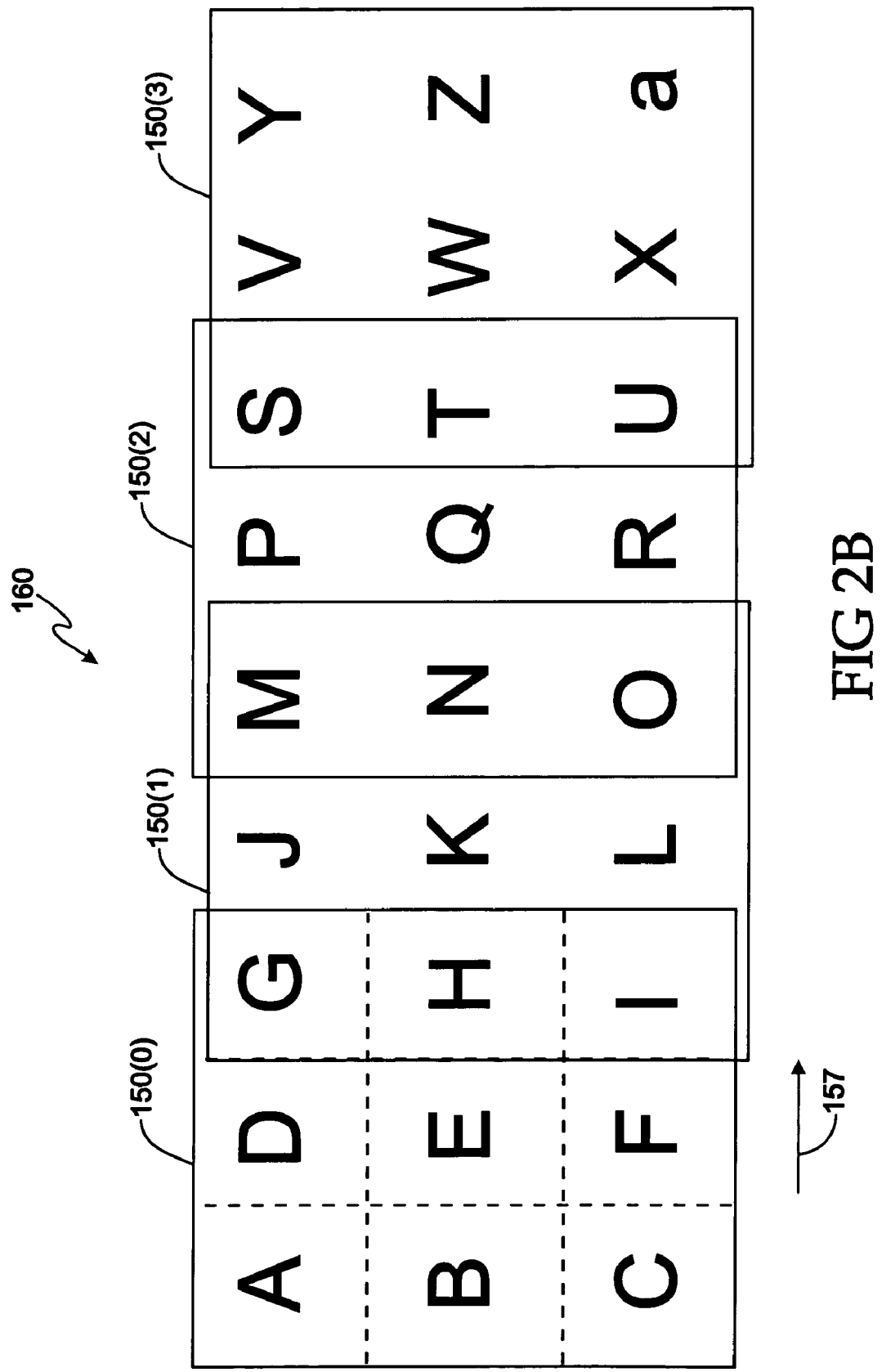
FIG. 2B is another drawing of the navigation surface of FIG. 2A.

FIG. 2B is another drawing of the navigation surface 160 of FIG. 2A. This figure shows the outline of the image 150 obtainable by the image sensor 110 in multiple positions relative to the navigation surface 160 of FIG. 2A. Also shown in FIG. 2B overlaying the navigation surface 160 is the outline of the image 150 obtainable by overlaying the navigation surface 160 with the image sensor array 110 in the reference position of FIG. 2A, as well as at positions following three separate movements of the image sensor 110 to the right (or equivalently following three separate movements of the navigation surface 160 to the left). In FIG. 2A, the reference image is indicated as initial reference image 150(0), and reference images following subsequent movements as image 150(1), as image 150(2), and as image 150(3).

Following the first movement, the image 150 capable of capture by the image sensor 110 is image 150(1) which comprises surface patterns G-O. Intermediate movements between that of images 150(O) and 150(1) with associated capture of images 150 may also be performed but for ease and clarity of illustration are not shown in FIG. 2B. Regardless, a re-referencing would be necessary with image 150(1) now becoming the new reference image 150, otherwise positional reference information would be lost.

Following the second movement, the image 150 capable of capture by the image sensor 110 is image 150(2) which comprises surface patterns M-U. Intermediate movements between that of images 150(1) and 150(2) with associated capture of images 150 may also be performed but for ease and clarity of illustration are not shown in FIG. 2B. Regardless, a re-referencing would be necessary with image 150(2) now becoming the new reference image 150, otherwise positional reference information would be lost.

Following the third movement, the image 150 capable of capture by the image sensor 110 is image 150(3) which comprises surface patterns S-Z and a. Intermediate movements between that of images 150(2) and 150(3) with associated capture of images 150 may also be performed but for ease and clarity of illustration are not shown in FIG. 2B. Regardless, a re-referencing would be necessary with image 150(3) now becoming the new reference image 150, otherwise positional reference information would be lost.

Figure 3:
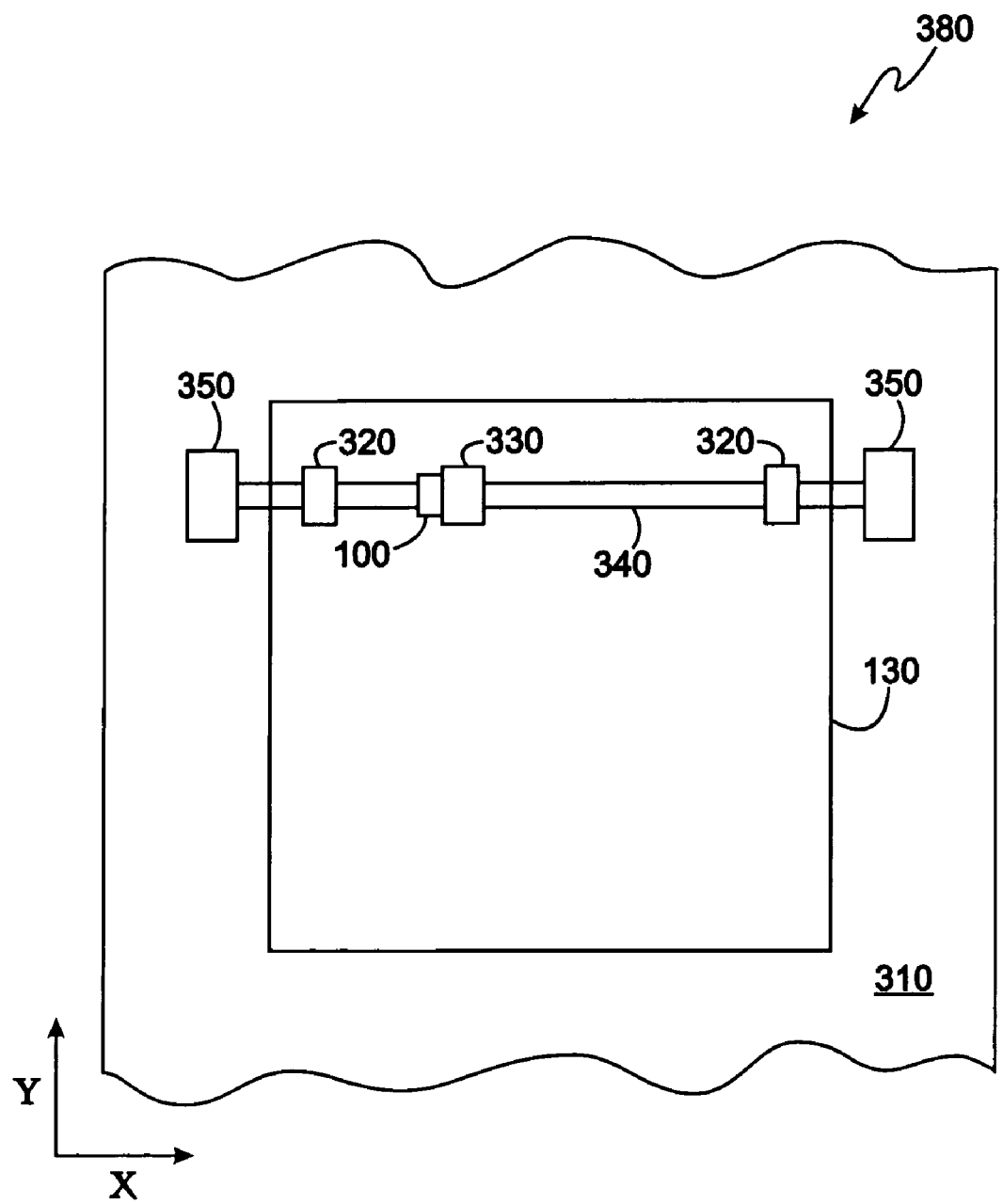
FIG. 3 is a drawing of a printer with an optical navigation system as described in various representative embodiments.

FIG. 3 is a drawing of a printer 380 with the optical navigation system 100 as described in various representative embodiments. In FIG. 3, a piece of paper 130 is shown placed on a platen 310. Rollers 320 hold the page 130 against the platen 310. Appropriate rotation of the rollers 320 moves the page 130 back and forth parallel to the Y-axis. A print head 330 is driven back and forth parallel to the X-axis along a rod 340 mounted between supports 350. Appropriate movement of the print head 330 places the print head 330 at a selected location over the page 130 for dispersing ink from the print head 330 to the page 130. In other applications, other devices 330 besides the print head 330 can be attached to the optical navigation system 100.

Figure 4A:
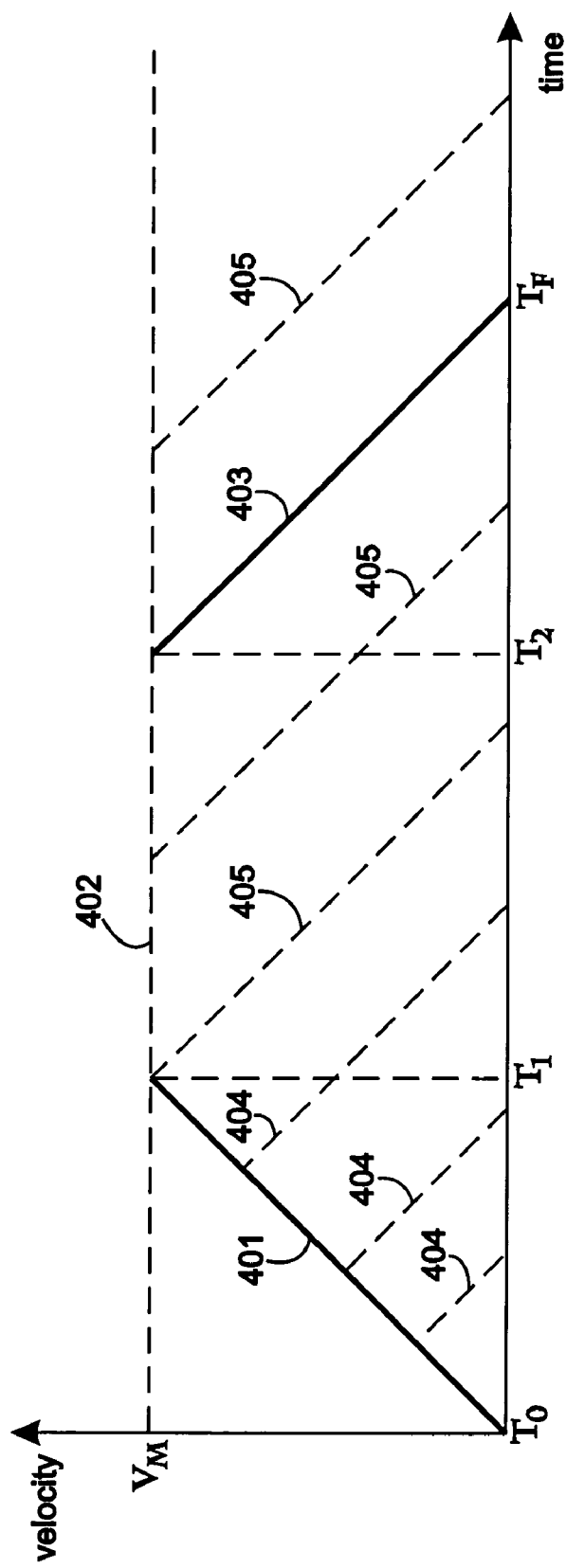
FIG. 4A is a plot of velocity versus time for the optical navigation system as described in various representative embodiments.

FIG. 4A is a plot of velocity versus time for the optical navigation system 100 as described in various representative embodiments. For the representative case of constant acceleration, velocity is determined as a function of time by the following equation: $v(t) = a*t$ wherein v is the velocity, a is the acceleration, and t is time as measured from the initiation of the acceleration. The more general relationship is $v(t) = \int [a(t)*dt]$. FIG. 4A assumes for illustrative purposes that the acceleration of the print head 330 is constant from initiation at time $T_0$ until time $T_1$. During the time period $T_0$ to $T_1$, the velocity in FIG. 4A is indicated by the solid line 401. At time $T_1$ a maximum velocity $V_M$ is reached and the acceleration force on the print head 330 is removed with any remaining force only matching the resistive forces in the system. During the time period $T_1$ to $T_2$, the velocity is indicated by the solid line 402. The print head 330 then travels at the constant velocity $V_M$ until time $T_2$ when the print head 330 begins to decelerate. Deceleration occurs again at an assumed constant rate which again for purposes of illustration only is assumed to be at the same rate as that of acceleration between times $T_0$ and $T_1$. During the time period $T_2$ to $T_F$, the velocity is indicated by the solid line 403. Time $T_0$ represents the time that movement of the print head 330 and optical navigation system 100 begin to move from a rest position. Typically for a printer 380 this movement at time $T_0$ is either in the X-direction or in the Y-direction, but not both at the same time. However, this is a choice of the application designer and not a constraint on the optical navigation system 100. Also, the choices of a constant acceleration and constant deceleration are made herein for ease of illustration. Other acceleration and velocity profiles are possible in any given application and may be dictated by the physical constraints of the application but not of the concepts of the representative embodiments herein.

Given the physical parameters of the system, i.e., acceleration and deceleration characteristics as well as the maximum velocity, time $T_F$ determines the stopping location of the print head 330 and the optical navigation system 100. Should the velocity never reach the maximum velocity $V_M$, deceleration will occur along dashed lines 404 as appropriate with the termination time again determining the stopping location of the print head 330 and the optical navigation system 100. Also, movement at the maximum velocity $V_M$ may occur at a time greater or less than $T_2$, in which case deceleration will occur along dashed lines 405 with final stopping times less than or greater than $T_F$ shown in FIG. 4A and corresponding stopping positions.

Figure 4B:
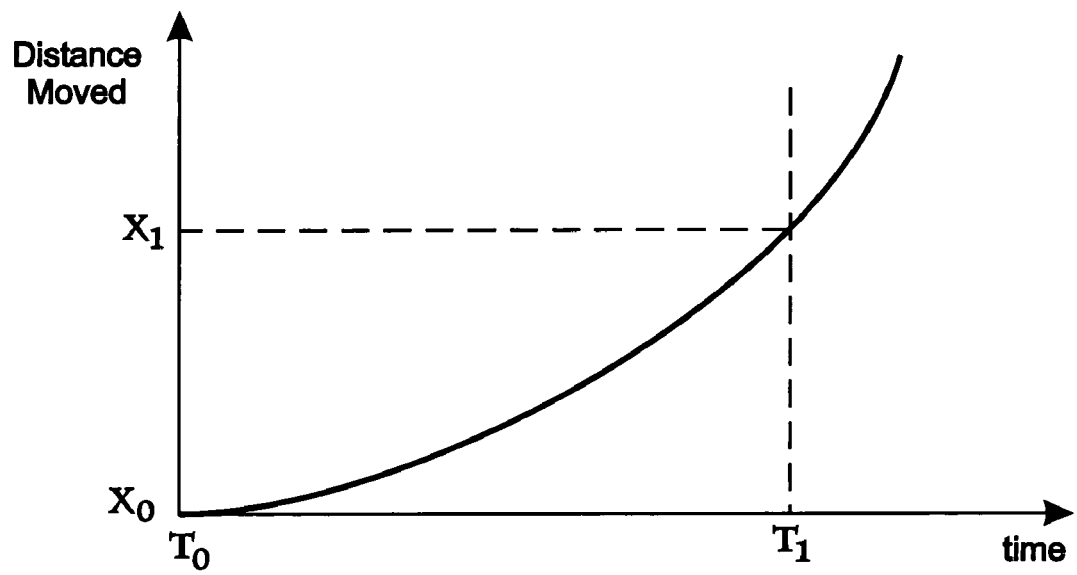
FIG. 4B is a plot of distance moved versus time for the optical navigation system as described in various representative embodiments.

FIG. 4B is a plot of distance moved versus time for the optical navigation system 100 as described in various representative embodiments. In FIG. 4B distance moved vs. time is plotted, as an example, for the print head 330 and optical navigation system 100 as in FIG. 3 for the acceleration phase during the times $T_0$ to $T_1$. The print head 330 and optical navigation system 100 move from location $X_0$ at time $T_0$ to location $X_1$ at time $T_1$.

Figure 4C:
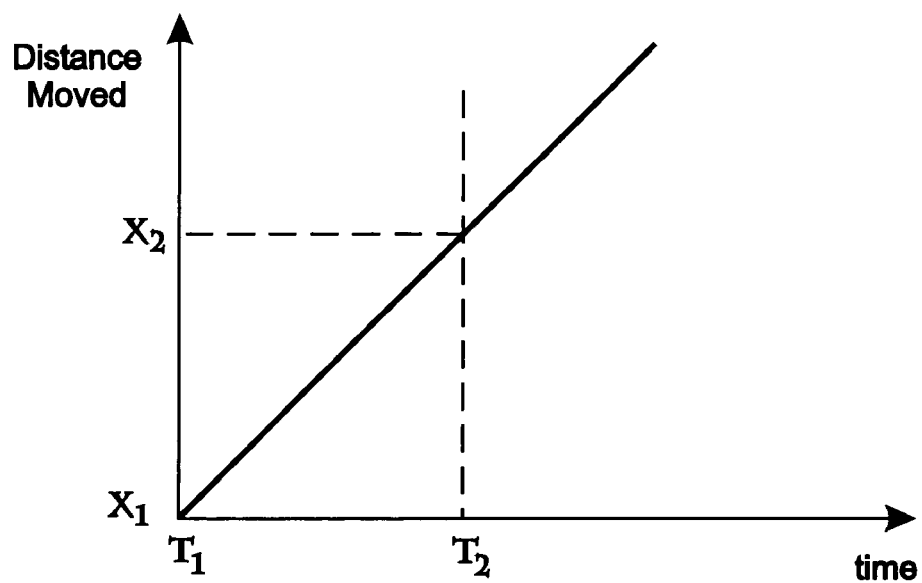
FIG. 4C is another plot of distance moved versus time for the optical navigation system as described in various representative embodiments.

FIG. 4C is another plot of distance moved versus time for the optical navigation system 100 as described in various representative embodiments. In FIG. 4C distance moved vs. time is plotted, again as an example, for the print head 330 and optical navigation system 100 as in FIG. 3 for the constant velocity phase during times $T_1$ to $T_2$. The print head 330 and optical navigation system 100 move from location $X_1$ at time $T_1$ to location $X_2$ at time $T_2$.

Figure 4D:
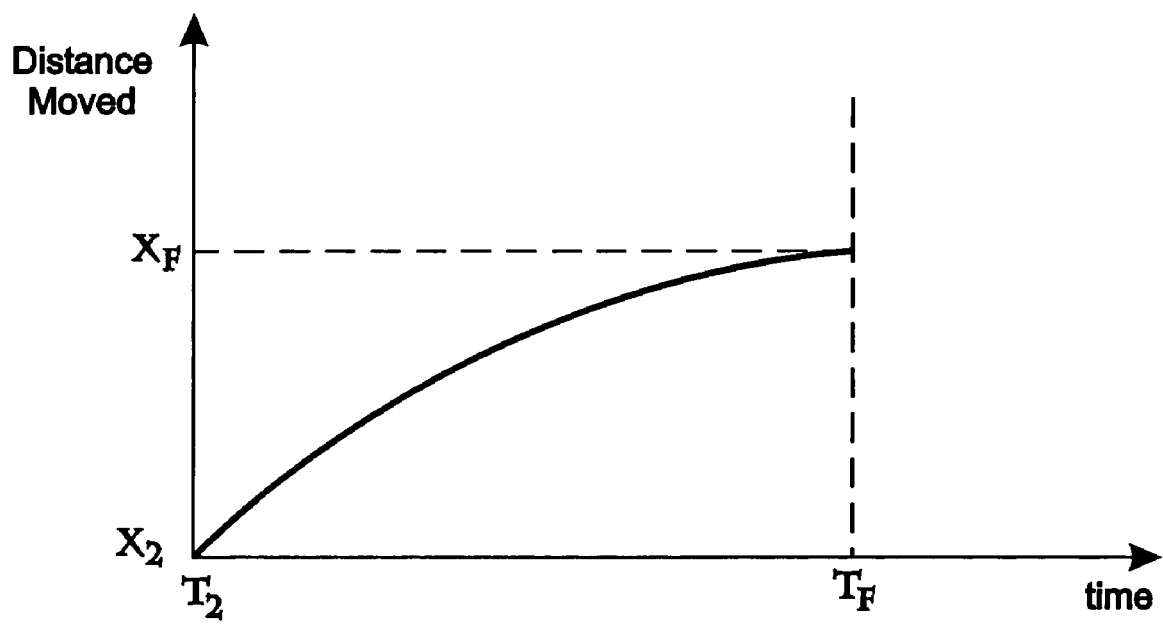
FIG. 4D is still another plot of distance moved versus time for the optical navigation system as described in various representative embodiments.

FIG. 4D is still another plot of distance moved versus time for the optical navigation system 100 as described in various representative embodiments. In FIG. 4D distance moved vs. time is plotted, and yet again as an example, for the print head 330 and optical navigation system 100 as in FIG. 3 for the constant velocity phase during times $T_2$ to $T_F$. The print head 330 and optical navigation system 100 move from location $X_2$ at time $T_2$ to location $X_F$ at time $T_F$.

Figure 4E:
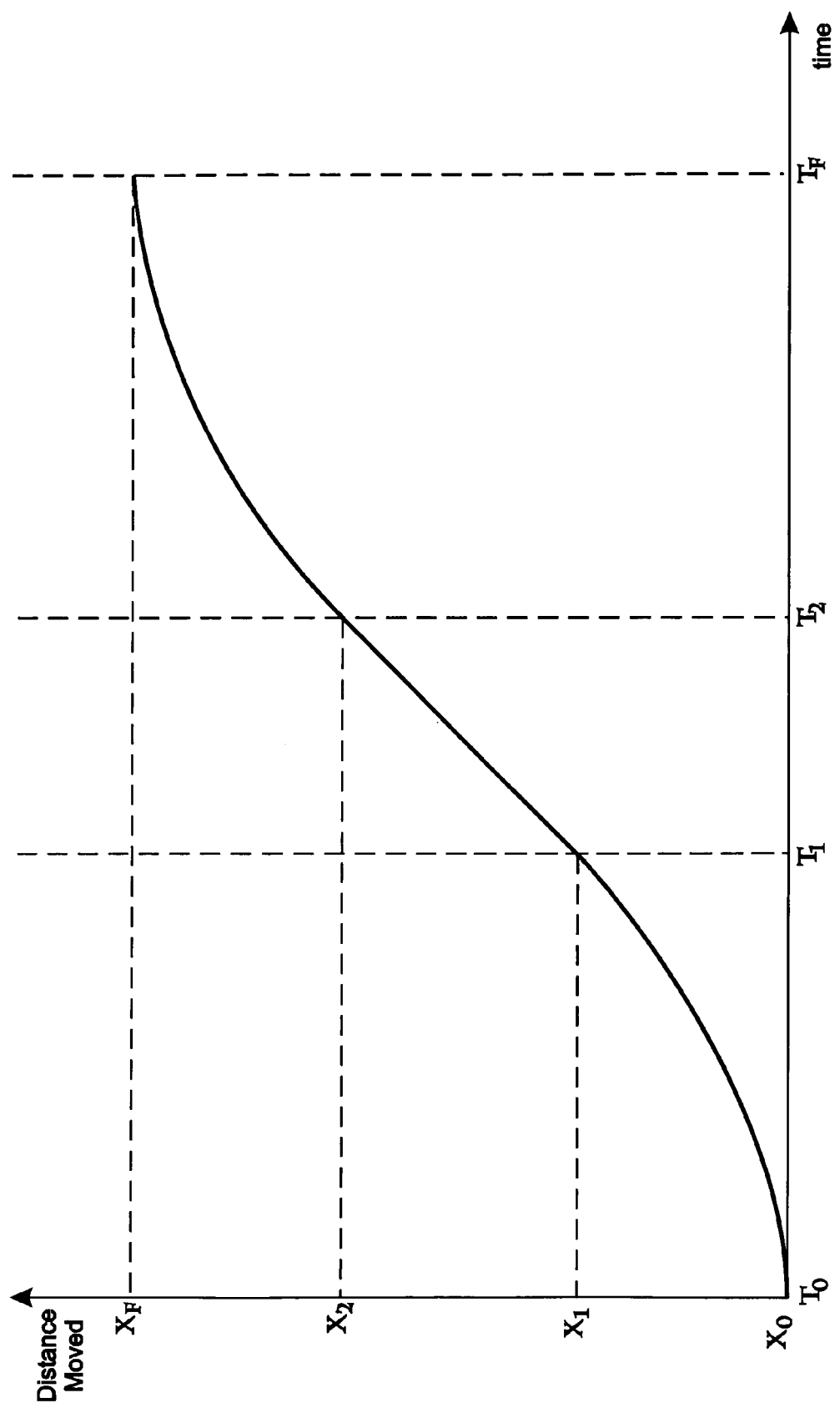
FIG. 4E is yet another plot of distance moved versus time for the optical navigation system as described in various representative embodiments.

FIG. 4E is yet another plot of distance moved versus time for the optical navigation system 100 as described in various representative embodiments. FIG. 4E is a composite plot of FIGS. 4B–4D. Note that at any position on FIGS. 4B–4E, the slope of the plot is equal to the velocity of the print head 330 and optical navigation system 100 at that time. Also, note that the slope of the respective plots is zero at times $T_0$ and $T_F$ corresponding to a zero velocity and that the slopes of the respective plots do not exhibit discontinuities at either $T_1$ between FIGS. 4B and 4C or at $T_2$ between FIGS. 4C and 4D.

Figure 5:
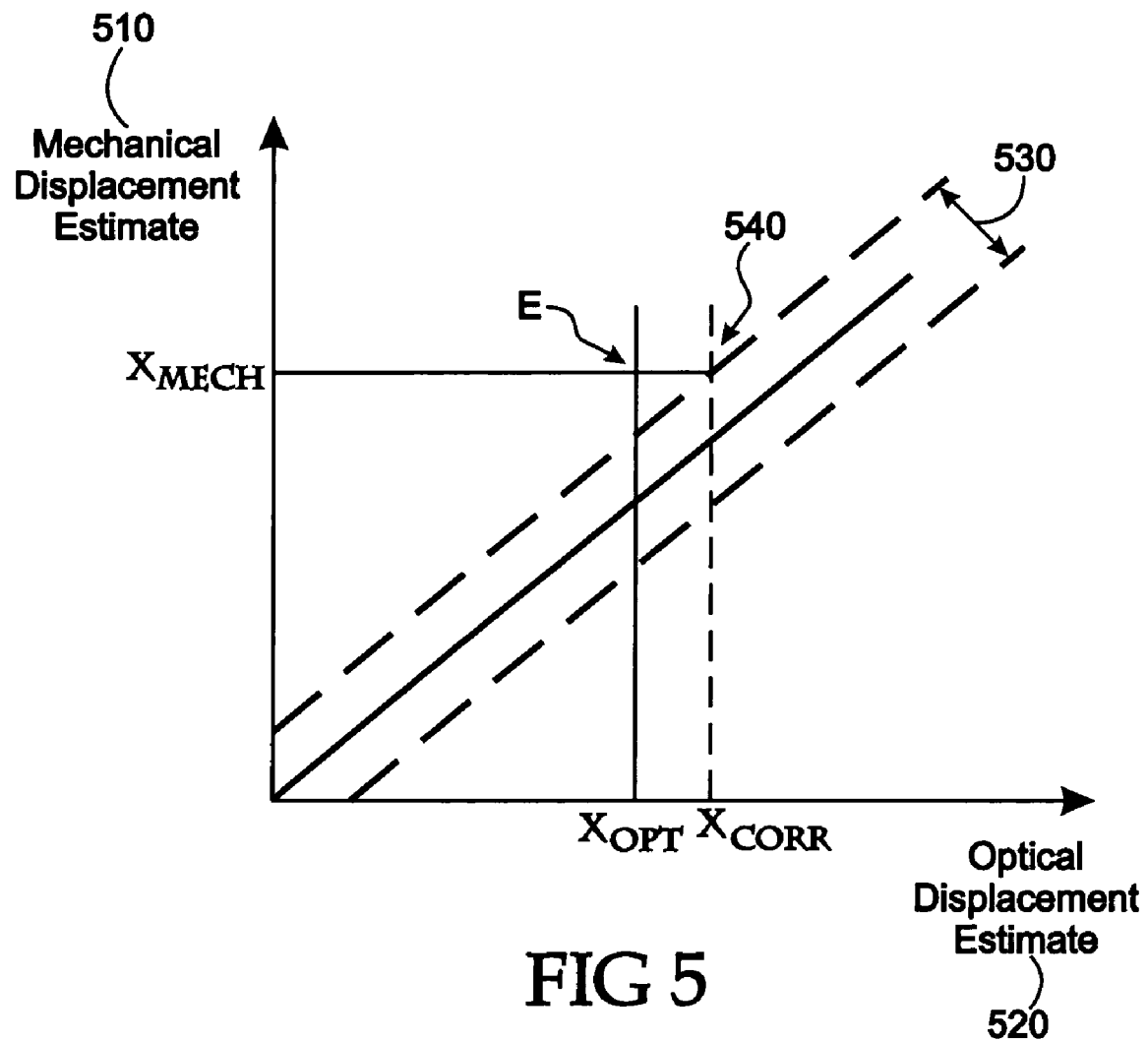
FIG. 5 is a plot of a mechanical displacement estimate versus an optical displacement estimate of the optical navigation system as described in various representative embodiments.

FIG. 5 is a plot of a mechanical displacement estimate 510 versus an optical displacement estimate 520 of the optical navigation system 100 as described in various representative embodiments. The ideal case with zero error in both the mechanical displacement estimate 510 and the optical displacement estimate 520 is shown by the solid, straight line rising at 45 degrees to the right in FIG. 5. Dashed lines parallel to the solid 45 degree line represent an error range 530 defined by the designer or user as being acceptable. In the example of FIG. 5, the mechanical displacement estimate 510 is $X_{MECH}$ and the optical displacement estimate 520 is $X_{OPT}$ which have intersection at point E. Note that in the representative example of FIG. 5, point E lies outside the acceptable error range 530. The displacement estimate which the system reports could be adjusted by taking the projection of the intersection of $X_{MECH}$ and the upper error range 45 degree line on the axis of optical displacement estimate 520 as an adjusted displacement estimate 540 indicated in FIG. 5 as $X_{CORR}$.

Other algorithms than that discussed for adjusting the optically determined location other than that discussed above are also possible. As an example, $X_{MECH}$ could be used as a maximum for $X_{OPT}$. Also, a minimum value for $X_{MECH}$ could also be determined for setting a minimum value for $X_{OPT}$. In addition, while the above example has used constant acceleration and constant declaration, more complex velocity/acceleration profiles could also be used and may, in fact, be dictated by the application. Further, the data may be theoretically or empirically determined. An still further, the motion profile may be accessed via equations, via tables of numbers representing the profile, or via other acceptable means.

Figure 6A:
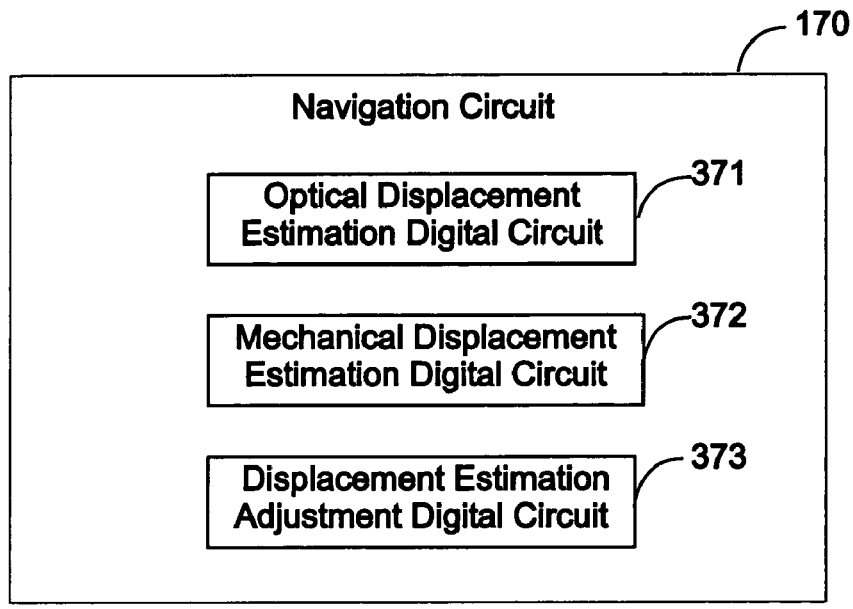
FIG. 6A is a drawing of a more detailed block diagram of part of the optical navigation system of FIG. 1.

FIG. 6A is a drawing of a more detailed block diagram of part of the optical navigation system of FIG. 1. In FIG. 6A, the navigation circuit 170 comprises an optical displacement estimation digital circuit 371, also referred to herein as a first digital circuit 371, for determining the optical displacement estimate 520 between the image sensor 110 and the object 130 obtained by comparing the image 150 captured at a given time to the image 150 captured at a subsequent time, a mechanical displacement estimation digital circuit 372, also referred to herein as a second digital circuit 372, for determining the mechanical displacement estimate 510 obtained from consideration of the mechanical characteristics of the optical navigation system 100, and a displacement estimation adjustment digital circuit 373, also referred to herein as a third digital circuit 373, for determining an adjusted displacement estimate 540 based on the optical displacement estimate 520 and the mechanical displacement estimate 510. Note that a displacement may or may not occur between the times corresponding to the capture of the two images 150.

Figure 6B:
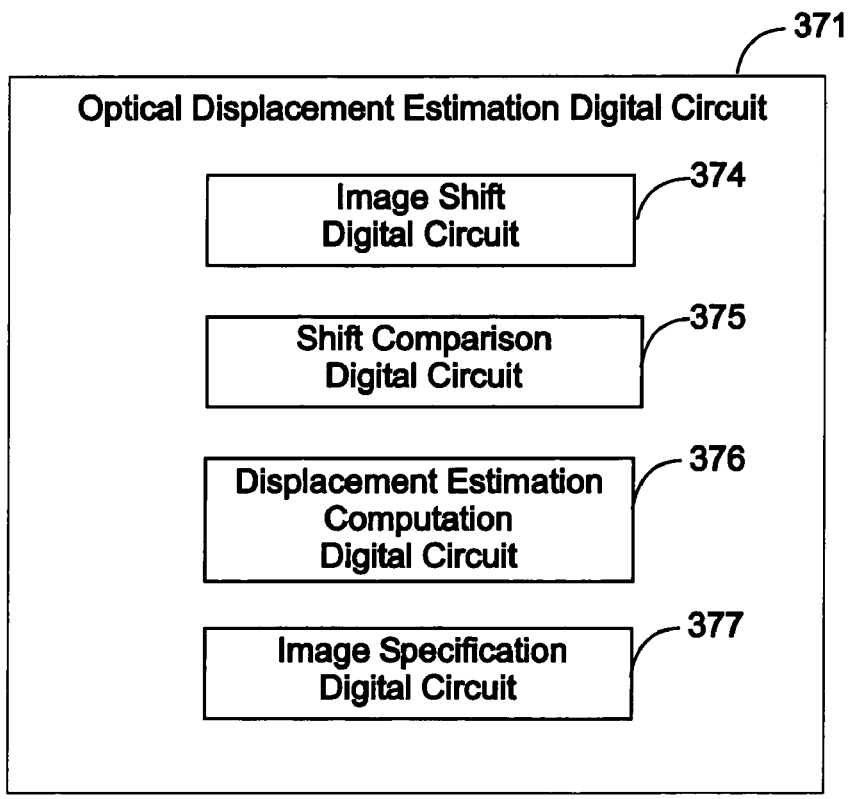
FIG. 6B is a drawing of a more detailed block diagram of a part of the optical navigation system of FIG. 6A.

FIG. 6B is a drawing of a more detailed block diagram of a part of the optical navigation system of FIG. 6A. In FIG. 6B, the optical displacement estimation digital circuit 371 comprises an image shift digital circuit 374, also referred to herein as a fourth digital circuit 374, for performing multiple shifts in one of the images 150, a shift comparison digital circuit 375, also referred to herein as a fifth digital circuit 375, for performing a comparison, which could be a cross-correlation comparison, between one of the other images 150 and the shifted multiple images 150, a displacement estimation computation digital circuit 376, also referred to herein as a sixth digital circuit 376, for using shift information for the shifted image 150, which information could be used in comparisons employing cross-correlations to the one other image 150, to compute the estimate of the relative displacement between the image sensor 110 and the object 130, and an image specification digital circuit 377, also referred to herein as a seventh digital circuit 377, for specifying which images 150 to use in determining the optical displacement estimate 520, i.e. the relative displacement between the image sensor 110 and the object 130.

Some integrated circuits, such as the Agilent ADNS-2030 which is used in optical mice, use a technique called "prediction" that reduces the amount of computation needed for cross correlation. In theory, an optical mouse could work by doing every possible cross-correlation of images (i.e., shift of 1 pixel in all directions, shift of 2 pixels in all directions, etc.) for any given pair of images. The problem with this is that as the number of shifts considered increases, the needed computations increase even faster. For example, for a 9×9 pixel optical mouse there are only 9 possible positions considering a maximum shift of 1 pixel (8 shifted by 1 pixel and one for no movement), but there are 25 possible positions for a maximum considered shift of 2 pixels, and so forth. Prediction decreases the amount of computation by pre-shifting one of the images based on an estimated mouse velocity to attempt to overlap the images exactly. Thus, the maximum amount of shift between the two images is smaller because the shift is related to the error in the prediction process rather than the absolute velocity of the mouse. Consequently, less computation is required. See U.S. Pat. No. 6,433,780 by Gordon et al.

Figure 7:
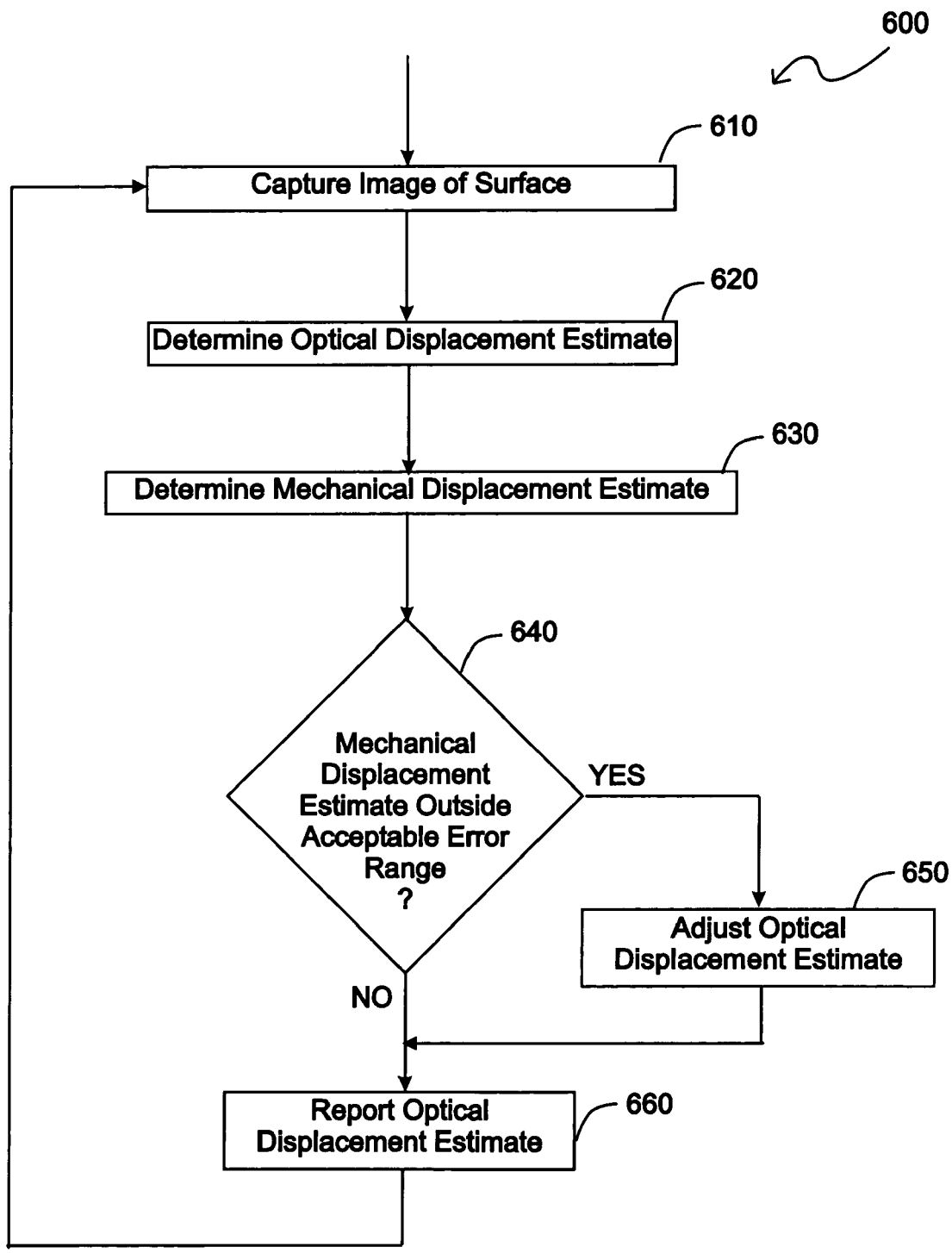
FIG. 7 is a flow chart of a method for using the optical navigation system as described in various representative embodiments.

FIG. 7 is a flow chart of a method 600 for using the optical navigation system 100 as described in various representative embodiments.

In block 610, an image 150 of an area of the surface 160 of the work piece 130 is captured by the optical navigation system 100. This image 150 is captured without prior knowledge of whether the optical navigation system 100 with the print head 330 is stationary or has been moved to a new location. Block 610 then transfers control to block 620.

In block 620, an expected new position, the optical displacement estimate $X_{OPT}$ of FIG. 5, is obtained by comparing successive images 150 of areas of the page 130 captured by the image sensor 110 as described above. Block 620 then transfers control to block 630.

In block 630, an expected new position based on mechanical profiles of the system, the mechanical displacement estimate $X_{MECH}$ of FIG. 5, is obtained by, for example, the techniques described above with respect to FIGS. 4A–4E. Block 630 then transfers control to block 640.

In block 640, if the theoretical mechanical location $X_{MECH}$ lies outside the acceptable error range 530, block 640 transfers control to block 650. Otherwise, block 640 transfers control to block 660.

In block 650, the optical displacement estimate $X_{OPT}$ is corrected by knowledge of $X_{MECH}$ to adjusted displacement estimate $X_{CORR}$. Block 650 then transfers control to block 660.

In block 660, the new position based on an initial starting location of the optical navigation system 100 is reported to the controller 190. The actual value reported depends upon the path taken to block 660. The reported value is that of the value of unadjusted optical displacement estimate $X_{OPT}$ if control is passed fro block 640 to block 660. Otherwise, the reported value is that of the value of the adjusted optical displacement estimate $X_{OPT}$. Block 660 then transfers control back to block 610.

Motion computations are performed for an optical navigation system in a way that is altered by knowledge of the movement profile of the device for which motion is being measured. By noting the direction of intended motion and the plausible acceleration and velocity profiles that the object is expected to undergo, it is possible to increase the accuracy of positional determination obtained from the cross-correlation based image motion measurements normally used by an optical mouse.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. An optical navigation system, comprising:
an image sensor capable of optical coupling to a surface of an object, wherein the image sensor is capable of capturing successive images of areas of the surface;
a data storage device, wherein the data storage device is capable of storing successive images captured by the image sensor; and
a navigation circuit, wherein the navigation circuit comprises a first digital circuit capable of determining an optical displacement estimate for a relative displacement between the image sensor and the object obtained by a comparison of the images, wherein the navigation circuit further comprises a second digital circuit capable of determining a mechanical displacement estimate for the relative displacement obtained from consideration of a mechanical characteristic associated with the optical navigation system, and wherein the navigation circuit comprises a third digital circuit capable of determining an adjusted displacement estimate obtained from the optical displacement estimate and the mechanical displacement estimate.

2. The optical navigation system as recited in claim 1, wherein the first digital circuit comprises:
a fourth digital circuit capable of performing multiple shifts in one of the images;
a fifth digital circuit capable of performing a comparison between one of the other images and the shifted multiple images; and
a sixth digital circuit capable of obtaining the optical displacement estimate from the comparisons of the fifth digital circuit.

3. The optical navigation system as recited in claim 2, wherein the comparisons of the fifth digital circuit are cross-correlations.

4. The optical navigation system as recited in claim 2, wherein the first digital circuit further comprises:
a seventh digital circuit capable of specifying which images to use for comparison by the fifth digital circuit to determine the optical displacement estimate.

5. The optical navigation system as recited in claim 1, wherein the mechanical characteristic is an acceleration profile.

6. The optical navigation system as recited in claim 5, wherein at least part of the acceleration profile is determined from theoretical considerations.

7. The optical navigation system as recited in claim 5, wherein at least part of the acceleration profile is empirically determined.

8. The optical navigation system as recited in claim 1, wherein the mechanical characteristic is an acceleration profile for the optical navigation system.

9. The optical navigation system as recited in claim 1, wherein the mechanical characteristic is an acceleration profile for the optical navigation system and at least one other device attached to the optical navigation system.

10. The optical navigation system as recited in claim 9, wherein the at least one other device is a print head.

11. The optical navigation system as recited in claim 1, wherein if the difference between the optical displacement estimate and the mechanical displacement estimate is outside a preselected error range, the third digital circuit reports the value of the optical displacement estimate adjusted in relation to the mechanical displacement estimate as the adjusted displacement estimate;
otherwise, the third digital circuit reports the value of the optical displacement estimate as the adjusted displacement estimate.

12. The optical navigation system as recited in claim 1, wherein if the difference between the optical displacement estimate and the mechanical displacement estimate is outside a preselected error range, the third digital circuit reports the value of the optical displacement estimate adjusted to the mechanical displacement estimate, wherein the mechanical displacement estimate is less than or equal to a specified maximum value;

otherwise, the third digital circuit reports the value of the optical displacement estimate as the adjusted displacement estimate.

13. The optical navigation system as recited in claim 1, wherein the optical navigation system is attached to a printer.

14. A method for error correcting an optical navigation system, comprising:

optically coupling an image sensor to a surface of an object;

capturing successive images with the image sensor of areas of the surface;

storing the successive images;

determining an optical displacement estimate for a relative displacement between the image sensor and the object by a comparison of the images;

determining a mechanical displacement estimate for the relative displacement by consideration of a mechanical characteristic associated with the optical navigation system; and determining an adjusted displacement estimate from the optical displacement estimate and the mechanical displacement estimate.

15. The method as recited in claim 14, wherein the step determining the optical displacement estimate for a relative displacement between the image sensor and the object comprises:

performing multiple shifts in one of the images;

performing a comparison between one of the other images and the shifted multiple images; and obtaining the optical displacement estimate from the results of the step performing a comparison between one of the other images and the shifted multiple images.

16. The method as recited in claim 14, wherein the mechanical characteristic is an acceleration profile.

17. The method as recited in claim 14, wherein the step determining an adjusted displacement estimate comprises:

if the difference between the optical displacement estimate and the mechanical displacement estimate is outside a preselected error range, reporting the value of the optical displacement estimate adjusted in relation to the mechanical displacement estimate as the adjusted displacement estimate;

otherwise, reporting the value of the optical displacement estimate as the adjusted displacement estimate.

18. The method as recited in claim 14, wherein if the mechanical displacement estimate indicates zero motion between successive images, the step determining an adjusted displacement estimate comprises:

averaging the optical displacement estimates to obtain the adjusted displacement estimate.

19. The method as recited in claim 14, the steps further comprising:

adjusting the threshold for re-referencing based upon the direction of motion and the mechanical characteristics in that direction.

20. The method as recited in claim 14, the steps further comprising:

adjusting the rate of image capture based on the mechanical characteristics and velocity of the optical navigation system.

\* \* \* \* \*